Patented May 21, 1946

2,400,720

UNITED STATES PATENT OFFICE 2,400,720

TREATMENT OF PLASTIC SURFACES

Hanns Peter Staudinger, Ewell, and Henry Malcolm Hutchinson, Banstead, England, assignors to The Distillers Company Limited, Edinburgh, Scotland, a British company No Drawing. Application July 19, 1943, Serial No. 495,366. In Great Britain February 20, 1942

15 Claims. (Cl. 117—118)

This invention relates to the treatment of plastic surfaces, or objects, or materials, made from or containing plastic substances, e. g., polystyrene resins, phenolic resins, coumarone and indene resins, of the type obtained by the polymerisation of polymerisable substances containing at least one aromatic nucleus including those plastics obtained by the conjoint polymerisation of polymerisable compounds containing aromatic nuclei with other polymerisable compounds and those plastics obtained from mixtures of polymerised compounds, at least one of which is derived from a polymerisable compound containing an aromatic nucleus.

It is well known that plastic surfaces of the above type are strongly hydrophobic and, for this reason, are difficult to colour by means of dyes soluble in water. It is difficult to cause such surfaces to adhere satisfactorily to other surfaces by means of adhesives of the glue, dextrin or silicate type.

We have now found that these surfaces, objects or materials can be rendered hydrophilic in accordance with this invention by treatment with concentrated sulphuric acid, fuming sulphuric acid, sulphur trioxide or chlorsulphonic acid. The treatment can be effected by use of the liquid acids or by exposure in their vapours.

The degree of treatment or modification of the surface can be regulated by varying the time and temperature of treatment by the acid or acid vapours which may be from a few seconds up to an hour or more. If treatment by acid vapour is employed, the degree of treatment may also be modified by variation of the concentration of the vapour from the acid.

Water is found to spread evenly over a polystyrene surface treated in this way instead of gathering into drops as occurs on an untreated surface. The treated surface will also take up basic dyes from an aqueous solution, whilst adhesives of the glue, dextrin or silicate type will adhere readily to such a surface.

It will be obvious that the whole of the surface of say a sheet of polystyrene need not be treated with the acid reagent but that areas of various shapes or forms can be subjected to the action of the acid or acid vapour. In this way it is possible to form letters and other shapes on the surface of polystyrene sheets by subjecting such treated areas to the action of dyes.

It is also possible to control the depth of colour over a treated polystyrene surface by immersing it in a dye solution and gradually withdrawing it so that the last part of the surface withdrawn from the solution of dye is most deeply coloured.

By dyeing the surface of a sheet of polystyrene which has been exposed to the vapours of fuming sulphuric acid for a few seconds, it is possible to obtain an extremely thin layer of dye of a thickness of $0.5\mu$ or even less. Such surfaces still retain their original smoothness and the treatment does not impair the optical properties of the sheet.

It is also possible to employ plastics treated in the above manner, particularly polystyrene, in the formation of printing blocks for use in conjunction with aqueous inks.

We have also found that metals may be easily deposited on such treated surfaces by allowing the surface to come into contact with an aqueous solution of a readily-reducible metal salt and reducing the metallic salt deposited on the surface. Thin films of copper and silver may be formed in this manner. Metals may also be applied to the treated surface by the process of low vacuum volatilisation; we have found that better adhesion is obtained when the metals are applied to treated, as compared with untreated, polystyrene surfaces.

It will be understood that plastic materials treated so that their surfaces become hydrophilic by the method of the present invention may be used for any purpose for which their hydrophilic properties render them suitable. For instance, a layer of the above-mentioned plastics can be deposited from solutions on a surface, and after evaporation of the solvent, the coated surface can be treated according to our invention. Also, a sheet or film of treated polystyrene can be secured to the interior surfaces of windows of glass or other transparent materials, e. g., automobile windscreens, airplane cockpit covers and the like, whereby the "misting" of these interior surfaces is prevented. The treated sheets or films may either be secured directly to the glass or other transparent material or they may be attached at their edges or other convenient points so as to leave a space between the faces of the sheets. A multi-layer component may be built up in this way.

We have also found that the process of our invention can be applied to the treatment of internal or external surfaces of windscreens, cockpit covers and the like, of plastic material. This is particularly advantageous if the internal or external surface is to be treated, e. g., by spraying, either continuously or intermittently, with an anti-freeze solution, such as an aqueous or alcoholic solution of glycol, glycerol, calcium chloride or other known agents for this purpose, as we have found that such solutions distribute themselves more evenly over the treated surface of the plastic material, and thus the interference with vision is much less with the more even film of liquid so obtained on the treated surface. This, of course, is of considerable importance in connection with the operation of aircraft under "icing" conditions. It would, of course, be possible to use sheets of material, treated by the present invention, for use in the manufacture of windscreens, or cockpit covers.

We have also found that electro-static charges do not accumulate on plastic surfaces treated according to the process of our invention and such treated plastic sheets can advantageously be used in the manufacture of covers, for instruments, dials, gauges, indicators and the like especially those in which accumulation of electrostatic charges on the cover has a disturbing influence on the instrument itself.

The following examples illustrate the manner in which the invention may be carried into effect:

Example 1

A sheet of transparent polystyrene of 3 mm. thickness is exposed on one side to the vapours of fuming sulphuric acid at room temperature. This is done by placing the sheet over a shallow flat dish containing a layer of the acid, thus maintaining a uniform distance between sheet and liquid. After exposure of two minutes, the sheet is removed and washed with water until free from sulphuric acid. After a final wash with distilled water, the sheet is left to dry in a dust-free atmosphere. The above treated sheet, the transparency of which is not impaired, can be cut into discs and fitted into respirator eye-pieces with the treated side inwards. These eye-pieces are much less liable to fog from condensation.

Example 2

A transparent sheet of polystyrene of 0.5 mm. thickness is exposed to the vapour of fuming sulphuric acid for 5 minutes in the manner described in Example 1. The treated sheet is washed free from sulphuric acid and is dyed without prior drying. A coloured screen with gradually increasing intensity is prepared by dyeing the treated polystyrene sheet with a solution of a water-soluble dyestuff in water in the following manner. The sheet is suspended in a trough vertically into which the dyestuff solution is allowed to flow gradually so that the lower parts of the sheet are dyed for a longer period than the upper parts. By varying the rate of addition of the dyestuff solution a screen with any desired degree of graduation and intensity can be prepared. By using Bismarck brown as a dyestuff, colour wedges suitable for haemometry can be prepared.

Example 3

A surface suitable for sticking with glue to a wooden panel may be given to a cast plate made from cast phenol formaldehyde plastic by treating the surface with liquid chlor-sulphonic acid for 10 minutes at room temperature. The surface is well washed with water and allowed to dry. The treated surface is then bonded to the wooden panel with hot glue in the manner ordinarily used for wood to wood glueing. When set the joint between plastic and wood is so strong that when applying sufficient force to break the bond, the fracture occurs on the wood/glue surface rather than on the plastic/glue surface.

Example 4

A compound screen suitable for use under "icing" conditions is composed of two transparent sheets separated by an air space between the faces. This is achieved by securing thin strips of 3 mm. thickness as a spacing frame along the edges of a polymethylmethacrylate sheet of ⅜" thickness. A sheet of polystyrene treated with the vapour of fuming sulphuric acid of 3 mm. thickness is secured to the spacing strip, with the treated surface to the outside. These spacing strips are secured to the two sheets by means of an adhesive solution of polyvinyl acetate in methyl acetate and are so arranged that a hermetically sealed cavity is obtained between the sheets. A solution consisting of 55% ethylene glycol and 45% water is then applied to the treated surface.

During a test the methyl methacrylate sheet of the screen was cooled to —50° C. and the treated surface was at the same time exposed to a humid atmosphere at 5 to 15° C. Under these conditions no fogging or freezing took place on the treated surface of the screen during the course of a test occupying many hours.

What we claim is:

1. A method of producing a hydrophilic surface on an object made from a hydrophobic polymer containing aromatic nuclei which comprises treating said surface with a member of the group consisting of concentrated sulphuric acid, fuming sulphuric acid, sulphur trioxide and chlorsulphonic acid without effecting any substantial alteration of the physical form of said surface, whereby the treated surface is rendered permanently hydrophilic.

2. A method according to claim 1 wherein the member of said group is used in the form of its vapour.

3. A method according to claim 1 wherein the degree of treatment is controlled by a variation of the time of the said treatment.

4. A method according to claim 1 wherein the degree of treatment is controlled by a variation of the temperature of the said treatment.

5. A method of producing a hydrophilic surface on an object made from a hydrophobic polymer containing aromatic nuclei which comprises treating said surface with the vapour of a member of the group consisting of concentrated sulphuric acid, fuming sulphuric acid, sulphur trioxide and chlorsulphonic acid without effecting any substantial alteration of the physical form of said surface, whereby the treated surface is rendered permanently hydrophilic and controlling the degree of treatment by a variation of the concentration of said vapour.

6. A method of rendering a sheet of a hydrophobic polymeric substance, containing aromatic nuclei in the molecular unit, non-misting which comprises treating the surfaces of said sheet with a member of the group consisting of concentrated sulphuric acid, fuming sulphuric acid, sulphur trioxide and chlorsulphonic acid without effecting any substantial alteration of the physical form of said surface, whereby the treated surface is rendered permanently hydrophilic.

7. A method of treating objects of polystyrene to render their surfaces permanently hydrophilic which comprises treating said surfaces with a member of the group consisting of concentrated sulphuric acid, fuming sulphuric acid, sulphur trioxide and chlorsulphonic acid without effecting any substantial alteration of the physical form of said surface.

8. A method of treating objects of a phenol-formaldehyde resin to render their surfaces permanently hydrophilic which comprises treating said surfaces with a member of the group consisting of concentrated sulphuric acid, fuming sulphuric acid, sulphur trioxide and chlorsulphonic acid without effecting any substantial alteration of the physical form of said surface.

9. A transparent closure member at least one of whose outer surfaces is composed of a plastic substance, consisting of a polymer containing aromatic nuclei, treated with a member of the group consisting of concentrated sulphuric acid, fuming sulphuric acid, sulphur trioxide and chlorsulphonic acid without effecting any substantial alteration of the physical form of said surface to render said closure member permanently non-misting.

10. A transparent closure member at least one of whose outer surfaces is composed of polystyrene treated with a member of the group consisting of concentrated sulphuric acid, fuming sulphuric acid, sulphur trioxide and chlorsulphonic acid without effecting any substantial alteration of the physical form of said surface to render said closure member permanently non-misting.

11. A transparent closure member at least one of whose outer surfaces is composed of a phenol-formaldehyde resin treated with a member of the group consisting of concentrated sulphuric acid, fuming sulphuric acid, sulphur trioxide and chlorsulphonic acid without effecting any substantial alteration of the physical form of said surface to render said closure member permanently non-misting.

12. A windshield at least one of whose outer surfaces is composed of a plastic substance, consisting of a polymer containing aromatic nuclei, treated with a member of the group consisting of concentrated sulphuric acid, fuming sulphuric acid, sulphur trioxide and chlorsulphonic acid without effecting any substantial alteration of the physical form of said surface to render said windshield permanently non-misting.

13. A windshield at least one of whose outer surfaces is composed of polystyrene treated with a member of the group consisting of concentrated sulphuric acid, fuming sulphuric acid, sulphur trioxide and chlorsulphonic acid without effecting any substantial alteration of the physical form of said surface to render said windshield permanently non-misting.

14. A windshield at least one of whose outer surfaces is composed of a phenol-formaldehyde resin treated with a member of the group consisting of concentrated sulphuric acid, fuming sulphuric acid, sulphur trioxide and chlorsulphonic acid without effecting any substantial alteration of the physical form of said surface to render said windshield permanently non-misting.

15. A method of rendering the surface of an object made from a hydrophobic plastic substance, comprising a co-polymer of a polymerisable substance containing aromatic nuclei, permanently hydrophilic which comprises subjecting said surface to a superficial treatment with a member of the group consisting of concentrated sulphuric acid, fuming sulphuric acid, sulphur trioxide and chlorsulphonic acid without effecting any substantial alteration of the physical form of said surface.

HANNS PETER STAUDINGER.
HENRY MALCOLM HUTCHINSON.